United States Patent
Iwamoto et al.

(10) Patent No.: US 9,391,315 B2
(45) Date of Patent: Jul. 12, 2016

(54) NEGATIVE ELECTRODE FOR LITHIUM ION BATTERY AND METHOD FOR PRODUCING THE SAME, AND LITHIUM ION BATTERY

(75) Inventors: Kazuya Iwamoto, Osaka (JP); Kunihiko Mineya, Osaka (JP); Shuji Ito, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 750 days.

(21) Appl. No.: 13/379,587

(22) PCT Filed: Apr. 21, 2011

(86) PCT No.: PCT/JP2011/002337
§ 371 (c)(1),
(2), (4) Date: Dec. 20, 2011

(87) PCT Pub. No.: WO2011/132428
PCT Pub. Date: Oct. 27, 2011

(65) Prior Publication Data
US 2012/0107684 A1  May 3, 2012

(30) Foreign Application Priority Data

Apr. 23, 2010 (JP) ................... 2010-100229

(51) Int. Cl.
*H01M 4/134* (2010.01)
*H01M 4/36* (2006.01)
(Continued)

(52) U.S. Cl.
CPC .............. *H01M 4/134* (2013.01); *H01M 4/366* (2013.01); *H01M 4/667* (2013.01); *H01M 4/70* (2013.01); *H01M 4/1395* (2013.01); *H01M 4/661* (2013.01); *H01M 10/052* (2013.01); *H01M 2004/025* (2013.01); *Y02E 60/122* (2013.01); *Y02P 70/54* (2015.11)

(58) Field of Classification Search
None
See application file for complete search history.

(56) References Cited

U.S. PATENT DOCUMENTS 5,580,686 A   12/1996   Shi et al.
6,358,650 B2 *  3/2002   McLin et al. ................. 429/245
(Continued)

FOREIGN PATENT DOCUMENTS

| CN | 1761086 A | 4/2006 |
| CN | 101485011 A | 7/2009 |

(Continued)

OTHER PUBLICATIONS

International Search Report issued in International Patent Application No. PCT/JP2011/002337 dated Jul. 26, 2011.

(Continued)

*Primary Examiner* — Carlos Barcena
*Assistant Examiner* — Wojciech Haske
(74) *Attorney, Agent, or Firm* — McDermott Will & Emery LLP

(57) ABSTRACT

A negative electrode for a lithium ion battery 10 includes a negative electrode current collector 11, a negative electrode active material layer 14, and a lithium silicate layer 15. The negative electrode active material layer 14 contains silicon. The lithium silicate layer 15 contains lithium, oxygen, and silicon forming a Li—O—Si bond, and is formed at the interface between the negative electrode current collector 11 and the negative electrode active material layer 14. The negative electrode active material layer 14 and the lithium silicate layer 15 may be composed of columnar bodies.

1 Claim, 7 Drawing Sheets

(51) Int. Cl.
*H01M 4/70* (2006.01)
*H01M 4/1395* (2010.01)
*H01M 4/66* (2006.01)
*H01M 10/052* (2010.01)
*H01M 4/02* (2006.01)

(56) References Cited

U.S. PATENT DOCUMENTS

| | | |
|---|---|---|
| 2002/0009647 A1 | 1/2002 | McLin et al. |
| 2005/0074671 A1 | 4/2005 | Sugiyama et al. |
| 2006/0099507 A1 | 5/2006 | Kogetsu et al. |
| 2009/0104536 A1 | 4/2009 | Kogetsu et al. |
| 2010/0040951 A1 | 2/2010 | Yamamoto et al. |
| 2010/0099029 A1 | 4/2010 | Kinoshita et al. |
| 2010/0112442 A1 | 5/2010 | Fujikawa et al. |
| 2010/0129711 A1 * | 5/2010 | Kashiwagi et al. ........... 429/209 |

FOREIGN PATENT DOCUMENTS

| | | | |
|---|---|---|---|
| JP | 2001052710 A * | 2/2001 | ............. H01M 4/66 |
| JP | 2004-127561 | 4/2004 | |
| JP | 2005-197080 | 7/2005 | |
| JP | 2006-107912 | 4/2006 | |
| JP | 2008-258154 | 10/2008 | |
| JP | 2009-123695 | 6/2009 | |
| WO | WO 2007/010922 A1 | 1/2007 | |
| WO | WO 2008023733 A1 * | 2/2008 | |
| WO | WO 2008111315 A1 * | 9/2008 | |

OTHER PUBLICATIONS

Chinese Search Report issued in corresponding Chinese Application No. 201180002581.7, dated Nov. 4, 2013, with English translation.
Extended European Search Report dated Jul. 22, 2015, issued in corresponding European application No. 11771768.6. 6 pgs.

* cited by examiner

NEGATIVE ELECTRODE FOR LITHIUM ION BATTERY AND METHOD FOR PRODUCING THE SAME, AND LITHIUM ION BATTERY

RELATED APPLICATIONS

This application is the U.S. National Phase under 35 U.S.C. §371 of International Application No. PCT/JP2011/002337, filed on Apr. 21, 2011, which in turn claims the benefit of Japanese Application No. 2010-100229, filed on Apr. 23, 2010, the disclosures of which Applications are incorporated by reference herein.

TECHNICAL FIELD

The present invention relates to an improvement in a negative electrode for a lithium ion battery.

BACKGROUND ART

In recent years, as a reduction in size and weight of portable electronic devices such as notebook personal computers and cellular phones proceeds, there is an increasing demand for secondary batteries as a power source for these devices. Particularly, lithium ion batteries have not only high capacity and high energy density but also excellent charge-discharge cycle characteristics, which are thus suitably used as a power source for portable electronic devices.

With the multifunctionalization of portable electronic devices, lithium ion batteries are required to have further higher energy density and even more improved charge-discharge cycle characteristics. As a negative electrode active material that satisfies such requirements, attention has been given to alloy-type active materials capable of absorbing and releasing lithium. Typical examples of the alloy-type active materials include silicon and tin. Alloys, oxides, and nitrides that contain such an element also are known.

The alloy-type active materials significantly expand when absorbing lithium ions. The stress accompanying the expansion of alloy-type active materials is a cause, for example, of cracks in an active material particle, separation of a negative electrode active material layer from a negative electrode current collector, and deformation of a negative electrode current collector.

Patent Literature 1 discloses an electrode having a current collector, and a thin film of an alloy-type active material formed on the current collector. The thin film is composed of a number of columnar bodies. The columnar bodies, for example, are regularly arranged in a staggered manner. According to the electrode disclosed in Patent Literature 1, the stress accompanying the expansion of an active material can be relaxed in a direction along the surface of the current collector.

Patent Literature 2 discloses a negative electrode including a current collector and a negative electrode active material layer that contains oxygen and silicon, in which the negative electrode active material layer has an enhanced concentration of oxygen in the vicinity of the current collector. According to the negative electrode disclosed in Patent Literature 2, the expansion and contraction of the negative electrode active material accompanying charge and discharge can be suppressed in the vicinity of the current collector.

However, even if the techniques of Patent Literatures 1 and 2 are employed, it is still not easy to achieve good cycle characteristics based on sufficient adhesion strength between a current collector and an active material thin film.

CITATION LIST

Patent Literature

Patent Literature 1: JP 2004-127561 A
Patent Literature 2: JP 2006-107912 A

SUMMARY OF INVENTION

Technical Problem

In view of the foregoing problems, an object of the present invention is to provide a technique to enhance the adhesion strength between a negative electrode current collector and a negative electrode active material layer.

Solution to Problem

That is, the present invention provides a negative electrode for a lithium ion battery including: a negative electrode current collector; a negative electrode active material layer containing silicon; and a lithium silicate layer that contains lithium, oxygen, and silicon forming a Li—O—Si bond, and that is formed at the interface between the negative electrode current collector and the negative electrode active material layer.

The present invention according to another aspect provides a method for producing a negative electrode for a lithium ion battery including the steps of forming a silicon oxide layer containing silicon and oxygen on a negative electrode current collector in such a manner that the oxygen concentration of the silicon oxide layer decreases stepwise or continuously as the distance from the surface of the negative electrode current collector increases; allowing the silicon oxide layer to absorb lithium; and maintaining the silicon oxide layer in an atmosphere with a dew point temperature of −20° C. or less for a specific period of time after the absorption step so that a lithium silicate layer that contains lithium, oxygen, and silicon forming a Li—O—Si bond is formed on the surface of the negative electrode current collector.

The present invention according to still another aspect provides a lithium ion battery including: the above-mentioned negative electrode for a lithium ion battery of the present invention; a positive electrode that contains a positive electrode active material capable of absorbing and releasing lithium; a separator disposed between the negative electrode and the positive electrode; and a non-aqueous electrolyte.

Advantageous Effects of Invention

According to the negative electrode for a lithium ion battery of the present invention, a lithium silicate layer is provided at the interface between the negative electrode current collector and the negative electrode active material layer. Lithium silicate having a Li—O—Si bond does not contribute to charge-discharge reactions. That is, lithium forming lithium silicate does not move during charge and discharge. Accordingly, it is possible to prevent excessive stress from occurring at the interface by providing a lithium silicate layer at the interface between the negative electrode current collector and the negative electrode active material layer. An increase in adhesion strength between the negative electrode current collector and the negative electrode active material layer can prevent the separation of the negative electrode active material layer from the negative electrode current collector. Therefore, lithium ion batteries produced using the negative electrode of the present invention can exhibit excellent cycle characteristics.

According to the production method of the present invention, a lithium silicate layer can be formed efficiently and easily at the interface between the negative electrode current collector and the negative electrode active material layer. The reason is not necessarily clear, but by maintaining the silicon oxide layer in a specific atmosphere for a specific period of time, lithium that has been absorbed by the silicon oxide layer moves to the vicinity of the surface of the negative electrode current collector and is bonded to oxygen, thus forming lithium silicate.

DESCRIPTION OF EMBODIMENTS

Figure 1A:
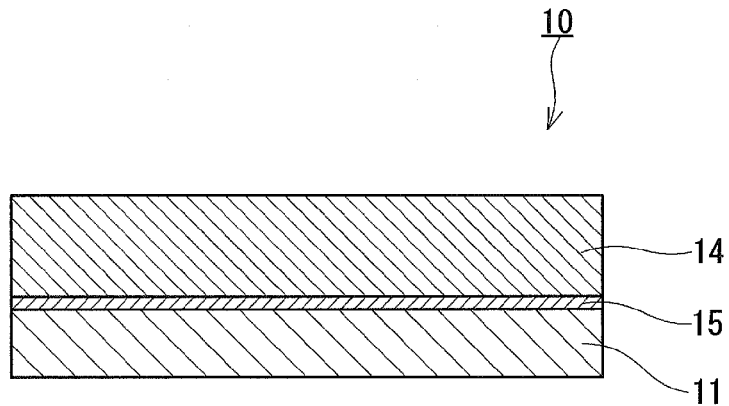
FIG. 1A is a longitudinal sectional view showing one embodiment of a negative electrode for a lithium ion battery of the present invention.

As shown in FIG. 1A, a negative electrode for a lithium ion battery 10 of this embodiment includes a negative electrode current collector 11, a negative electrode active material layer 14, and a lithium silicate layer 15. The negative electrode active material layer 14 contains silicon as a negative electrode active material. The lithium silicate layer 15 is provided between the negative electrode current collector 11 and the negative electrode active material layer 14. Specifically, the lithium silicate layer 15 is present at the interface between the negative electrode current collector 11 and the negative electrode active material layer 14.

The lithium silicate layer 15 has been already formed before the step in which the negative electrode 10 is assembled into a battery. Therefore, the effect due to the lithium silicate layer 15 can be obtained from the first charge/discharge of the battery produced using the negative electrode 10. That is, it is possible to prevent excessive stress from occurring at the interface between the negative electrode current collector 11 and the negative electrode active material layer 14.

In this embodiment, the negative electrode active material layer 14 further contains oxygen. That is, the negative electrode active material layer 14 contains silicon oxide. The use of silicon oxide having a composition with lower oxygen ratio ($SiO_x$, $0<x<2$) than the stoichiometric composition makes it possible to control the degree of expansion of the negative electrode active material layer 14 during charge. Further, the lithium silicate layer 15 has higher oxygen content ratio than the negative electrode active material layer 14 in this embodiment. As mentioned later, it is possible to form the lithium silicate layer 15 selectively at the interface between the negative electrode current collector 11 and the negative electrode active material layer 14 by increasing the oxygen content ratio in the region adjacent to the negative electrode current collector 11.

Further, an oxygen concentration gradient may be formed within the negative electrode active material layer 14. That is, the oxygen concentration gradient can be formed such that the oxygen content ratio is high in the region near the negative electrode current collector 11 while the oxygen content ratio is low in the region far from the negative electrode current collector 11. In that case, "the oxygen content ratio of the negative electrode active material layer 14" can be specified by the average oxygen content ratio of the negative electrode active material layer 14. Also in the case where the negative electrode active material layer 14 has an oxygen concentration gradient, the lithium silicate layer 15 in contact with the negative electrode current collector 11 preferably has the highest oxygen content ratio.

The negative electrode active material layer 14 may contain lithium. The negative electrode active material layer 14 can contain lithium present in a metallic state and lithium forming a Li—O—Si bond, as well. However, the negative electrode active material layer 14 has a lithium silicate content ratio that is sufficiently lower than the lithium silicate content ratio of the lithium silicate layer 15. In other words, the lithium silicate layer 15 has a lithium silicate content ratio that is higher than the total lithium silicate content ratio in the negative electrode active material layer 14 and the lithium silicate layer 15.

The lithium silicate content ratio can be measured, for example, by Auger electron spectroscopy. The negative electrode active material layer 14 and the lithium silicate layer 15 each have an almost uniform distribution of lithium concentration in some cases, or have a non-uniform distribution of lithium concentration in other cases. In the latter case, "the lithium silicate content ratio of the lithium silicate layer 15" and "the lithium silicate content ratio of the negative electrode active material layer 14" can be specified from the mean value in each layer.

The mean value of the lithium silicate content ratio can be determined by quantitative analysis of lithium silicate in the thickness direction of the target layer. If the quantitative analysis in the cross section is difficult, it also is possible that the surface of the layer to be analyzed is treated by a method such as sputtering and chemical etching to be exposed, and then the surface thereof is subjected to quantitative analysis of lithium silicate.

The thickness of the lithium silicate layer 15 is in the range, for example, of 0.25 to 5.0 μm, preferably in the range of 0.5 to 3 μm. When the lithium silicate layer 15 has a thickness in such a range, it is possible to prevent excessive stress from occurring at the interface between the negative electrode current collector 11 and the negative electrode active material layer 14 without fail. However, formation of the lithium silicate layer 15 with an excessive thickness beyond the necessity should be avoided in view of the energy density because the lithium silicate layer 15 does not contribute to charge and discharge.

The thickness of the lithium silicate layer 15 can be measured, for example, by Auger electron spectroscopy. Specifically, mapping of lithium bonded to oxygen is performed through the observation of the cross section of the negative electrode 10 by Auger electron spectroscopy. The thickness of the lithium silicate layer 15 is calculated from the mapping data.

Figure 1B:
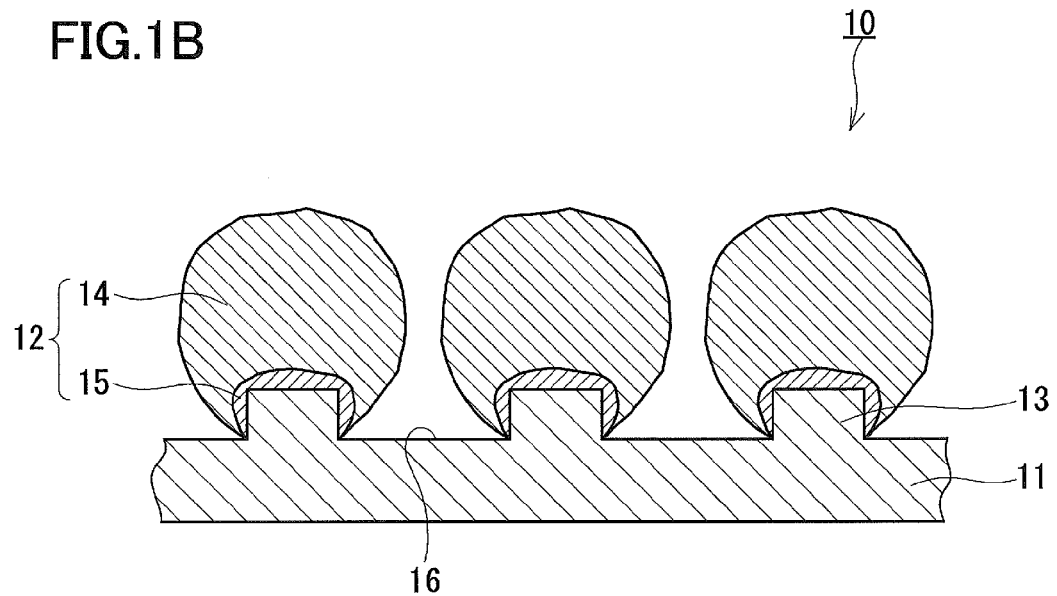
FIG. 1B is a longitudinal sectional view showing another embodiment of the negative electrode for a lithium ion battery of the present invention.

In the embodiment shown in FIG. 1A, the negative electrode active material layer 14 and the lithium silicate layer 15 each are in the form of a thin film having a uniform density. On the other hand, the negative electrode active material layer 14 and the lithium silicate layer 15 may be composed of a plurality of columnar bodies 12, as shown in FIG. 1B. In the negative electrode 10 shown in FIG. 1B, the negative electrode current collector 11 includes convex portions 13 and a concave portion 16 on its one surface. The columnar bodies 12 are formed at intervals from each other so as to extend outwardly from the one surface of the negative electrode current collector 11. The columnar bodies 12 are supported by the convex portions 13 of the negative electrode current collector 11. It should be noted that, although another plurality of columnar bodies 12 and convex portions 13 are actually present behind the columnar bodies 12 and convex portions 13, the illustration thereof is omitted.

Figure 2:
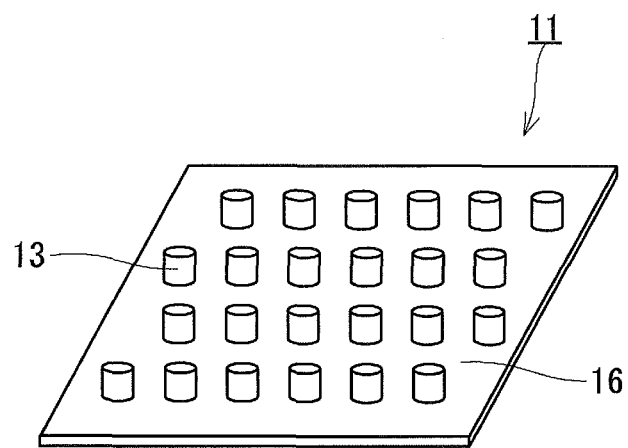
FIG. 2 is a schematic perspective view of a negative electrode current collector used for the negative electrode shown in FIG. 1B.

As shown in FIG. 2, the convex portions 13 are regularly arranged at intervals from each other on the surface of the negative electrode current collector 11. The interval between each adjacent two of the columnar bodies 12 can be adjusted by the shape and arrangement of the convex portions 13. According to this structure, when the negative electrode active material layer 14 is expanded due to absorption of lithium, stress accompanying the expansion can be relaxed.

In the embodiment shown in FIG. 1B, the columnar bodies 12 and the convex portions 13 are arranged, for example, in a staggered lattice pattern (an alternating pattern or a staggered pattern). The arrangement of the columnar bodies 12 and the convex portions 13 is not limited to this, and other arrangements such as a checkerboard lattice pattern (checker pattern) also can be employed.

When the negative electrode active material layer 14 is composed of a plurality of columnar bodies 12, the stress accompanying the expansion of the negative electrode active material layer 14 during charge can be relaxed in a direction along the surface of the negative electrode current collector 11. Further, when the negative electrode current collector 11 has the convex portions 13 and the concave portion 16 on its surface, the columnar bodies 12 can be easily formed by oblique deposition to be described later. Furthermore, when the convex portions 13 and the concave portion 16 are regularly arranged, the intervals between the columnar bodies 12 can be easily ensured.

The negative electrode current collector 11 is typically composed of copper or copper alloy. For example, rolled foil or electrolytic foil composed of copper or copper alloy can be used as the negative electrode current collector 11. Particularly, electrolytic foil with high surface roughness is preferred. Further, copper alloy has high mechanical strength, and therefore is preferred as a material for the negative electrode current collector 11. In this description, foil made of copper or copper alloy is referred to collectively as "copper foil".

The tensile strength of copper foil, for example, is at least 6 N/mm, preferably at least 8 N/mm, more preferably at least 10 N/mm. Sufficient tensile strength of copper foil allows sufficient mechanical strength of the negative electrode current collector 11 to be ensured. Ultimately, when a battery is produced using the negative electrode 10, wrinkles and the like can be prevented from occurring in the negative electrode 10.

The thickness of the negative electrode current collector 11, as measured at a portion other than the convex portions 13 (that is, the concave portion 16), for example, is 1 to 50 µm, preferably 6 to 40 µm, more preferably 8 to 33 µm.

As shown in FIG. 2, each of the convex portions 13, for example, has a circular shape in plan view. Other examples of the shape of the convex portions 13 include polygonal shapes such as square, rectangular, rhomboid, and pentagon, and elliptical shapes.

The height of each of the convex portions 13, for example, is 2 to 15 µm, preferably 6 to 12 µm. The convex portions 13 with sufficient height allow the shadowing effect of the convex portions 13 to be exhibited sufficiently when the columnar bodies 12 are formed by a vapor phase method such as vapor deposition. That is, it is possible to prevent the deposition of the negative electrode active material on a part of the surface of the negative electrode current collector 11 that is shadowed by the convex portions 13, which facilitates the growth of the negative electrode active material into columnar bodies. On the other hand, in order to increase the energy density by suppressing the volume ratio of the negative electrode current collector 11 in the negative electrode 10, the height of the convex portions 13 should be adjusted within a rational range.

The diameter of each of the convex portions 13, for example, is 2 to 200 µm, preferably 10 to 50 µm. The interval between each adjacent two convex portions 13, as measured in terms of the distance between the centers of the two convex portions 13, for example, is 10 to 100 µm, preferably 20 to 80 µm, further preferably 20 to 60 µm. An appropriate design of the convex portions 13 makes it possible to surely suppress the deformation of the convex portions 13 and the deformation of the negative electrode current collector 11 during charge and discharge.

The surface roughness Rz of the negative electrode current collector 11, for example, is 0.1 to 30 µm, preferably 0.5 to 15 µm. When the negative electrode current collector 11 has a surface roughness Rz in such a range, it is easy to obtain good adhesion strength between the negative electrode current collector 11 and the columnar bodies 12. In order to increase the energy density by suppressing the volume ratio of the negative electrode current collector 11 in the negative electrode 10, the surface roughness Rz of the negative electrode current collector 11 also should be adjusted within a rational range. It should be noted that the "surface roughness Rz" means the "maximum height Rz" as defined in Japan industrial standard (JIS) B 0601-2001, which can be measured using a commercially available surface roughness meter.

The growth direction of the columnar bodies 12 may be parallel to the normal direction of the negative electrode current collector 11 (specifically, the normal direction to the surface of the negative electrode current collector 11), or may be inclined at an angle. When the growth direction of the columnar bodies 12 is inclined at an angle to the normal direction of the negative electrode current collector 11, advantageous effects such as an improvement in charge-discharge efficiency can be obtained.

Figure 3:
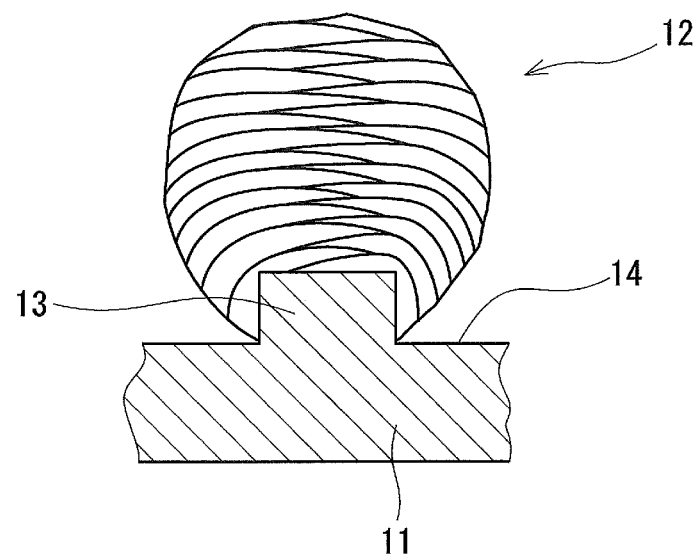
FIG. 3 is a longitudinal sectional view showing a detailed structure of columnar bodies.

As shown in FIG. 3, the columnar bodies 12 each may be formed by laminating a plurality of layers. Each layer contains silicon and oxygen. The plurality of layers each may be inclined at an angle to the normal direction of the negative electrode current collector 11. That is, the normal direction of each layer needs not to coincide with the normal direction of the negative electrode current collector 11. The columnar bodies 12 having such a structure enables the stress due to the volume expansion during absorption of lithium by the negative electrode active material layer 14 to be relaxed further effectively. The plurality of layers each may be in the form of particles (grains).

Further, the columnar bodies 12 may be provided on both sides of the negative electrode current collector 11 with the growth direction of the columnar bodies 12 being inclined at an angle to the normal direction of the negative electrode current collector 11. In this case, the inclined direction of the columnar bodies 12 provided on one surface of the negative electrode current collector 11 and the inclined direction of the columnar bodies 12 provided on the other surface thereof may be different from each other, or may be the same.

The columnar bodies 12 shown in FIG. 1B have grown in a substantially constant direction. However, the growth direction of the columnar bodies 12 may vary with the height of the columnar bodies 12.

Figure 1C:
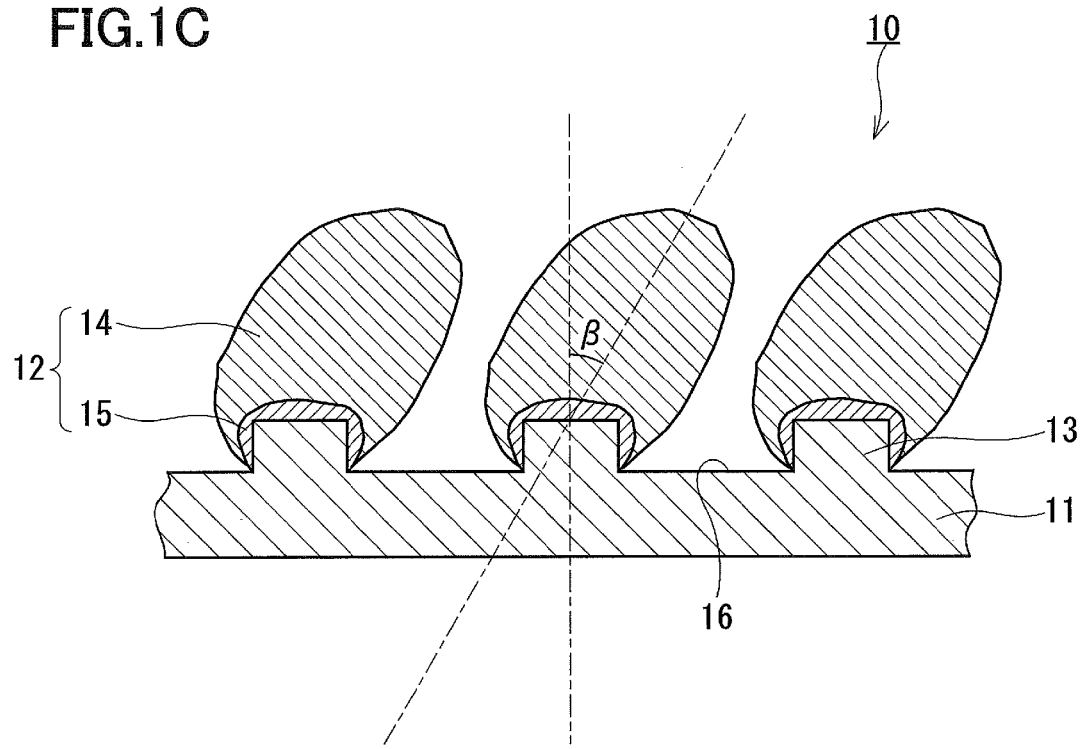
FIG. 1C is a longitudinal sectional view showing still another embodiment of the negative electrode for a lithium ion battery of the present invention.

As shown in FIG. 1C, in the case where the growth direction of the columnar bodies 12 is inclined at an angle, the angle (inclination angle β) made by the growth direction of the columnar bodies 12 and the normal direction of the negative electrode current collector 11, for example, is at least 10° but less than 90°, preferably at least 10° but not more than 80°. By appropriately adjusting the inclination angle β within such a range, the following effects can be obtained. That is, the convex portions 13 of the negative electrode current collector 11 are enabled to support the columnar bodies 12 easily. Further, in a direction facing a positive electrode active material layer, excessive blocking of each of the columnar bodies 12 by other adjacent columnar bodies 12 can be avoided. Therefore, the percentage of the columnar bodies 12 that contribute to battery reactions can be kept high, which allows a battery with excellent high-rate characteristics to be provided. Furthermore, the area of the exposed part of the negative electrode current collector 11 facing the positive electrode active material layer is prevented from being too large, thus making it possible to provide a battery with excellent charge-discharge efficiency. It should be noted that the inclination angle β can be calculated by measuring the angle made by the growth direction of the columnar bodies 12 and the normal direction of the negative electrode current collector 11 for arbitrary two to ten columnar bodies 12, and averaging the measured values.

When the growth direction of the columnar bodies 12 is inclined, not only the area of the exposed part (the concave portion 16) of the negative electrode current collector 11 facing the positive electrode active material layer is reduced but also the possibility of lithium precipitation on the exposed part can be reduced. Therefore, the charge-discharge efficiency and the charge-discharge cycle characteristics can be improved. Particularly, it is possible to significantly suppress the sudden deterioration in the cycle characteristics that occurs in charge and discharge with high current.

In this embodiment, the height of the columnar bodies 12 is equal to the sum of the thickness of the negative electrode active material layer 14 and the thickness of the lithium silicate layer 15. The height of the columnar bodies 12 should be appropriately set corresponding to the performance, etc. of the battery to be produced, and thus is not specifically limited. However, it, for example, is 3 to 40 μm, preferably 5 to 30 μm, further preferably 8 to 25 μm. When the columnar bodies 12 have a height within the above-mentioned range, the volume ratio of the negative electrode active material with respect to the entire volume of the negative electrode 10 also is sufficiently high. Therefore, the use of the negative electrode 10 of this embodiment allows a battery with high energy density to be provided. In addition, the stress that occurs at the interface between the negative electrode current collector 11 and the negative electrode active material layer 14 during charge is prevented from excessively increasing, so that defects such as the deformation of the negative electrode current collector 11 and the separation of the negative electrode active material layer 14 from the negative electrode current collector 11 can be prevented.

The height of the columnar bodies 12 is specified by the distance from the top of the convex portions 13 of the negative electrode current collector 11 to the top of the columnar bodies 12. Specifically, the height of the columnar bodies 12 can be measured by the following method. First, the overall thickness of the negative electrode 10 after the columnar bodies 12 are formed is measured. In the case where the columnar bodies 12 are provided only on one surface of the negative electrode current collector 11, the height of the columnar bodies 12 can be calculated by subtracting the thickness of the negative electrode current collector 11 from the overall thickness of the negative electrode 10. In the case where the columnar bodies 12 are provided on both surfaces of the negative electrode current collector 11, the total of the height of the columnar bodies 12 on both sides can be calculated by subtracting the thickness of the negative electrode current collector 11 from the overall thickness of the negative electrode 10. It should be noted that in the case where the surface of the negative electrode current collector 11 has convex and concave portions, the thickness is calculated using the top of the convex portions 13 of the negative electrode current collector 11 as a reference.

The negative electrode active material used for the negative electrode 10 of this embodiment may be single crystalline, polycrystalline, microcrystalline, or amorphous. The polycrystalline active material herein includes a plurality of crystallites (crystal grains) The microcrystalline active material includes a crystallite, for example, with a size of 50 nm or less. Whether the active material is amorphous or the active material is microcrystalline can be investigated using an X-ray diffraction (XRD), a transmission electron microscope (TEM), etc. The particle size of the crystallites can be calculated from the half-value width of the peak with the highest intensity in the range of 2θ=15 to 40° in the diffraction pattern obtained from XRD measurement of the active material, using the Scherrer equation. When no sharp peak but only a broad halo pattern can be observed in the range of 2θ=15 to 40° in the diffraction pattern, the active material can be determined to be substantially amorphous.

Specifically, a compound containing silicon and oxygen can be used as a material for the negative electrode active material layer 14. The compound containing silicon and oxygen may further contain nitrogen. The compound containing silicon and oxygen is preferably silicon oxide, particularly preferably silicon oxide having a composition expressed by the general formula: $SiO_x$ ($0<x<2$). The "x" that denotes the oxygen ratio is preferably in the range of $0.01 \leq x \leq 1$. The negative electrode active material layer 14 may contain a composite of a plurality of silicon oxides that have different oxygen ratios with respect to silicon from each other.

The negative electrode active material layer 14 and the lithium silicate layer 15 each may contain an unavoidable impurity such as Fe, Al, Ca, Mn, and Ti.

Next, a method for producing a negative electrode for a lithium ion battery according to this embodiment is described. The negative electrode 10 that has been described with reference to FIG. 1B is produced through the following steps. First, a silicon oxide layer containing silicon and oxygen is formed on the negative electrode current collector 11 in such a manner that the oxygen concentration in the silicon oxide layer decreases stepwise or continuously as the distance from the surface of the negative electrode current collector 11 increases (silicon oxide layer forming step). Next, the silicon oxide layer is allowed to absorb lithium (lithium absorption step). Finally, the silicon oxide layer is maintained in a specific atmosphere for a specific period of time so that the lithium silicate layer 15 is formed on the surface of the negative electrode current collector 11 (lithium silicate layer forming step).

(A) Silicon Oxide Layer Forming Step

Figure 4:
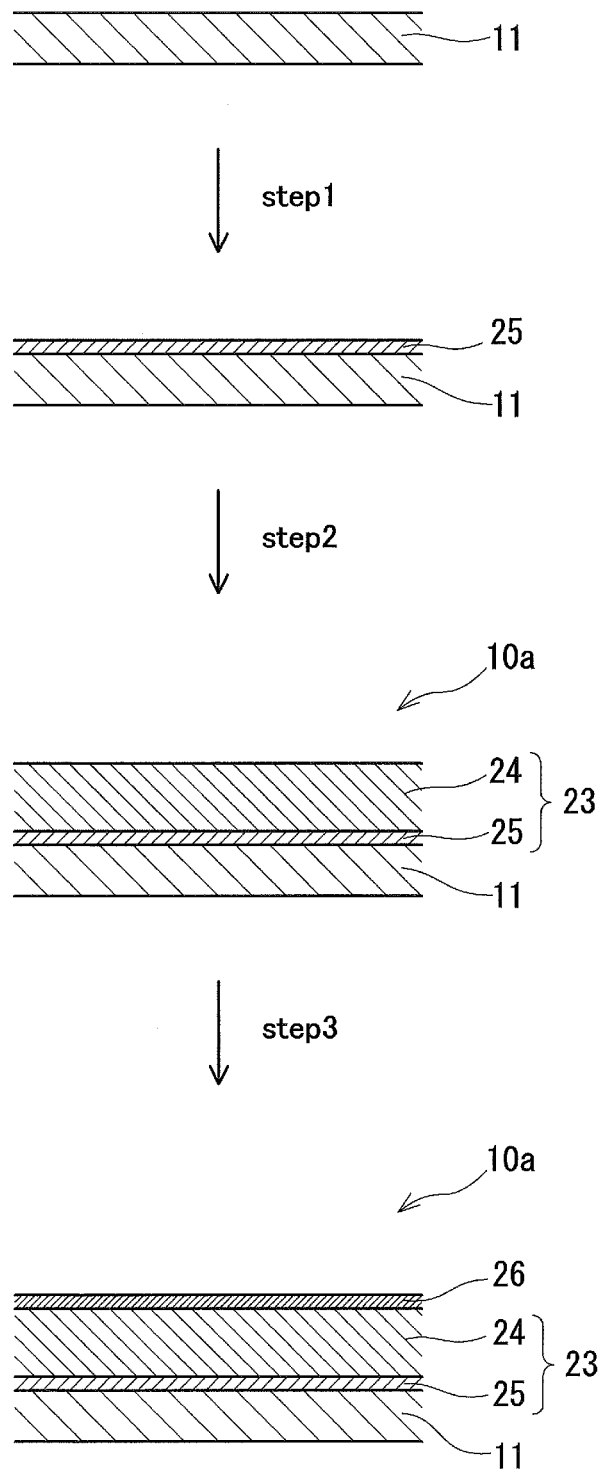
FIG. 4 is a process diagram for producing the negative electrode for a lithium ion battery.

First, as shown in FIG. 4, a first silicon oxide layer 25 composed of silicon oxide having a composition with relatively high oxygen ratio ($SiO_x$, $0<x<2$) is formed on the surface of the negative electrode current collector 11 (step 1). Next, a second silicon oxide layer 24 composed of silicon oxide having a composition with relatively low oxygen ratio ($SiO_y$, $0<y<x$) is formed so as to cover the first silicon oxide layer 25 (step 2). Thus, a preliminary negative electrode 10a composed of the negative electrode current collector 11 and a silicon oxide layer 23 (the first silicon oxide layer 25 and the second silicon oxide layer 24) is obtained. The first silicon oxide layer 25 has an oxygen ratio, for example, expressed by $0.5<x<1.5$ and the second silicon oxide layer 24 has an oxygen ratio, for example, expressed by $0<y<1.2$, where $y<x$ however is satisfied.

The first silicon oxide layer 25 is a layer that mainly contributes to the formation of the lithium silicate layer 15. After undergoing the later mentioned lithium silicate layer forming step, the silicon oxide contained in the first silicon oxide layer 25 can be converted into lithium silicate. Accordingly, the first silicon oxide layer 25 can be formed so as to have a thickness equal to the thickness of the lithium silicate layer 15 to be formed. The second silicon oxide layer 24 is a layer of which the negative electrode active material layer 14 should be mainly composed. Likewise, the second silicon oxide layer 24 can be formed so as to have a thickness equal to the thickness of the negative electrode active material layer 14 to be formed.

It also is possible to perform the silicon oxide layer forming step so that three or more silicon oxide layers each having different oxygen content ratios from the others are formed. Moreover, it also is possible to form a silicon oxide layer on the negative electrode current collector 11 so that the oxygen content ratio continuously decreases as the distance from the surface of the negative electrode current collector 11 increases.

The silicon oxide layer 23 can be formed by a dry film forming method (vapor phase method) such as vacuum deposition, sputtering, and chemical vapor deposition (CVD). According to the dry film forming method, it is easy to adjust the oxygen ratio. As a method for adjusting the oxygen ratio, for example, there are a method of adjusting the flow rate of oxygen to be introduced into the chamber of the film forming device and a method of adjusting the composition of the raw material to be held in the film forming source. According to the former method, the amount of oxygen to be introduced into the chamber is relatively increased in the step of forming the first silicon oxide layer 25, while the amount of oxygen to be introduced into the chamber is relatively decreased in the step of forming the second silicon oxide layer 24. According to the latter method, silicon oxide having a composition with relatively high oxygen ratio is used as a film forming source in the step of forming the first silicon oxide layer 25, while silicon oxide having a composition with relatively low oxygen ratio is used as a film forming source in the step of forming the second silicon oxide layer 24. The switching of the film forming sources can be carried out, for example, by a known load lock system. Of course, it also is possible to adjust the oxygen ratios using several methods in combination.

Figure 5:
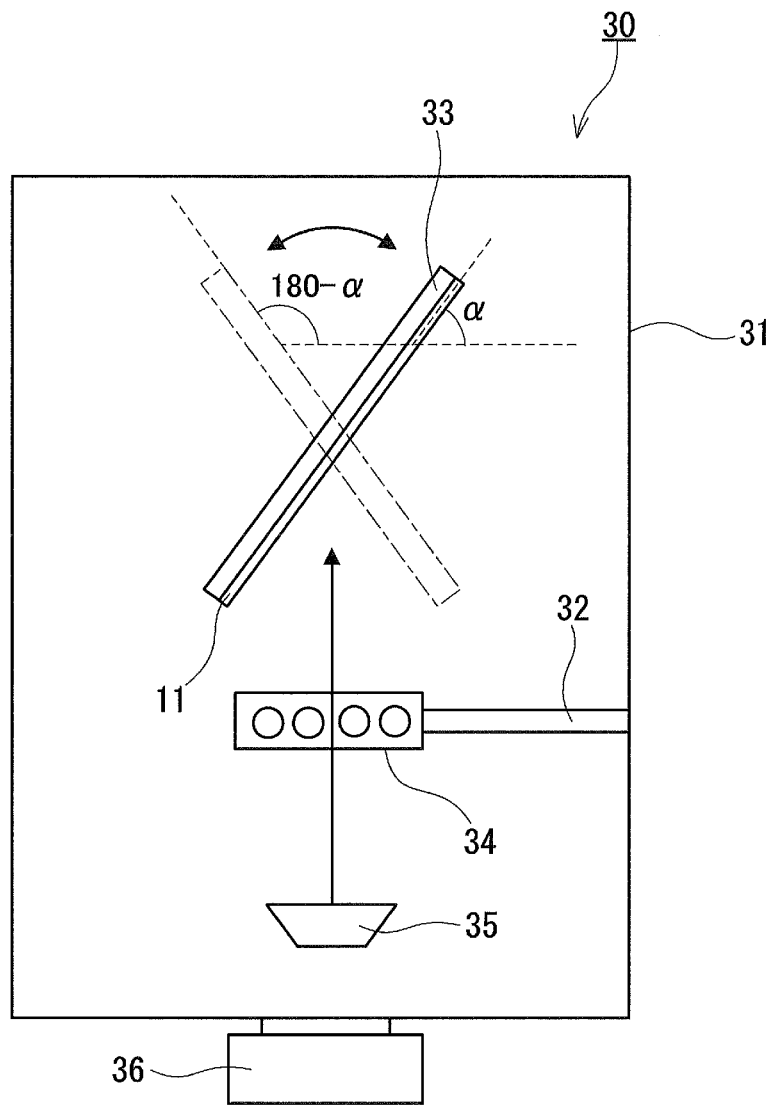
FIG. 5 is a schematic view showing an example of a vapor deposition apparatus.

Further, the silicon oxide layer 23 composed of a plurality of columnar bodies can be formed, using an electron beam vapor deposition apparatus 30 having a structure shown in FIG. 5, by allowing silicon oxide to deposit on the negative electrode current collector 11 provided with the convex portions 13 and the concave portion 16. That is, the step of forming the silicon oxide layer 23 can be performed so that the silicon oxide layer 23 is composed of a plurality of columnar bodies that extend outwardly from the surface of the negative electrode current collector 11 and that are formed at intervals from each other.

The vapor deposition apparatus 30 has a chamber 31 and a power source 36. The chamber 31 accommodates a pipe 32, a mounting base 33, a nozzle 34, a target 35, and an electron beam emitting device, which is not shown. In FIG. 5, the respective members in the chamber 31 are shown by solid lines. The chamber 31 is composed of a pressure resistant container. One end of the pipe 32 is connected to the nozzle 34 while the other end of the pipe 32 extends outwardly of the chamber 31 and is connected to a raw material source such as a raw material gas tank. The raw material gas can be supplied to the nozzle 34 through the pipe 32. Examples of the raw material gas include oxygen, nitrogen, and the like.

The mounting base 33 is composed of a plate member and is rotatably supported. The negative electrode current collector 11 is fixed onto one surface in the thickness direction of the mounting base 33. The mounting base 33 rotates with the axis of rotation (not shown) extending in a direction perpendicular to the figure (the paper surface) as its center. The position of the mounting base 33 can be flexibly set in the range from the position shown by a solid line to the position shown by a dashed line in FIG. 5. The surface of the mounting base 33 on the side to which the negative electrode current collector 11 is fixed faces the nozzle 34 disposed downward in the vertical direction. When the mounting base 33 is at the position shown by the solid line, the angle made by the mounting base 33 and a line in the horizontal direction is $\alpha°$. When the mounting base 33 is at the position shown by the dashed line, the angle made by the mounting base 33 and a line in the horizontal direction is $(180-\alpha)°$. The angle $\alpha°$ can be appropriately selected corresponding to the size and the growth direction of the columnar bodies to be formed.

The nozzle 34 is provided between the mounting base 33 and target 35 in the vertical direction. One end of the pipe 32 is connected to the nozzle 34. A raw material gas supplied to the nozzle 34 through the pipe 32 is mixed with the vapor of a negative electrode active material that has risen upward in the vertical direction from the target 35. The mixed vapor is supplied to the negative electrode current collector 11 fixed to the mounting base 33.

The target 35 accommodates a negative electrode active material (for example, silicon). The electron beam emitting device (not shown) emits an electron beam, which irradiates and heats the negative electrode active material accommodated in the target 35. Thus, the vapor of the negative electrode active material is generated. The power source 36 is provided outside the chamber 31 and is connected electrically to the electron beam emitting device so as to apply a voltage for generating the electron beam to the electron beam emitting device. The atmosphere in the chamber 31 can be adjusted by connecting a second pipe, which is not shown, to the chamber 31 and appropriately introducing gas through the second pipe. A commercial product having the same configuration as the above-described vapor deposition apparatus 30, for example, is available from ULVAC, Inc.

(B) Lithium Absorption Step

Next, the silicon oxide layer 23 is allowed to absorb lithium. Specifically, at least one selected from the first silicon oxide layer 25 and the second silicon oxide layer 24 is allowed to absorb lithium. It is not impossible to perform the lithium absorption step between the step of forming the first silicon oxide layer 25 and the step of forming the second silicon oxide layer 24. However, in view of production efficiency, etc., it is preferable to perform the absorption step after continuously performing the step of forming the first silicon oxide layer 25 and the step of forming the second silicon oxide layer 24.

As a method for giving lithium and allowing it to be absorbed, there are a method (i) in which lithium metal is deposited by a vapor phase method, and a method (ii) in which lithium metal foil and the silicon oxide layer 23 are heated while being in contact with each other. According to the method (i), lithium metal can be deposited on the silicon oxide layer 23 (specifically, on the second silicon oxide layer 24) by a vapor phase method. When lithium metal is deposited on the silicon oxide layer 23, lithium can be diffused easily inside the silicon oxide layer 23 and absorbed. The lithium absorbed by the silicon oxide layer 23 moves preferentially or selectively to the vicinity of the interface between the negative electrode current collector 11 and the silicon oxide layer 23, and then forms lithium silicate in the lithium silicate forming step to be described later. In this embodiment, lithium moves preferentially or selectively to the first silicon oxide layer 25 and forms lithium silicate. That is, according to the method (i), it is possible to form the lithium silicate layer 15 comparatively easily. Further, the method (i) is suitable for mass production.

In order to allow lithium to be absorbed by the method (i), the vapor deposition apparatus 30 that has been described with reference to FIG. 5, for example, can be used. In the absorption step, a vapor deposition process is performed using lithium as the target 35 in the vapor deposition apparatus 30. Thus, as shown by step 3 of the process diagram in FIG. 4, a layer 26 made of lithium metal can be formed on the second silicon oxide layer 24. The thickness of the layer 26 should be adjusted corresponding to the total thickness of the silicon oxide layer 23. Typically, lithium is deposited on the silicon oxide layer 23 in an amount that corresponds to the irreversible capacity of the negative electrode 10 to be produced. The lithium contained in the layer 26 rapidly diffuses into the silicon oxide layer 23. As a method other than vapor deposition, sputtering and CVD (Chemical Vapor Deposition) can be mentioned.

The irreversible capacity of the negative electrode 10 can be specified by the following method. A battery assembled with a negative electrode that has not absorbed lithium is charged and discharged, and the amounts of charged electricity and discharged electricity for the first time are measured. The difference in amount between the charged electricity and discharged electricity is the irreversible capacity.

In the case where the silicon oxide layer 23 is composed of columnar bodies, it is preferable that lithium be preferentially deposited on the surface of the columnar bodies and not deposited on the concave portion 16 of the negative electrode current collector 11 as much as possible. From this viewpoint, the position of the mounting base 33 is appropriately set at the time of vapor deposition of lithium within a range from the position shown by the solid line to the position shown by the dashed line in FIG. 5 corresponding to the direction in which lithium is irradiated and the growth direction of the columnar bodies.

On the other hand, in order to allow lithium to be absorbed by the method (ii), lithium metal foil is brought into contact with the silicon oxide layer 23, and the two are heated at a temperature at which the thermal diffusion of lithium into the silicon oxide layer 23 sufficiently proceeds. Such a temperature, for example, is 60 to 180° C. It should be noted that the absorption amount (compensation amount) of lithium can be controlled more easily in the method (i) compared to the method (ii). Therefore, the method (i) is particularly recommended.

(C) Lithium Silicate Layer Forming Step

In the lithium silicate layer forming step, the silicon oxide layer 23 after the absorption step is maintained in an atmosphere with a dew point temperature, for example, of −20° C. or less for a specific period of time. This specific period, for example, is a period sufficient to allow lithium metal that has deposited on the silicon oxide layer 23 to move to the vicinity of the interface between the negative electrode current collector 11 and the silicon oxide layer 23. Specifically, it is a period sufficient to allow lithium metal that has deposited on the second silicon oxide layer 24 to move to the first silicon oxide layer 25. Active lithium that has been absorbed by the first silicon oxide layer 25 and the second silicon oxide layer 24 selectively moves to the first silicon oxide layer 25. In other words, lithium segregates to the first silicon oxide layer 25. In the first silicon oxide layer 25, lithium forms a Li—O—Si bond together with oxygen and silicon. As a result, the lithium silicate layer 15 is formed from the first silicon oxide layer 25. The second silicon oxide layer 24 functions as the negative electrode active material layer 14 as it is. In this way, according to the method of this embodiment, the lithium silicate layer 15 can be formed efficiently at the interface between the negative electrode current collector 11 and the negative electrode active material layer 14.

Specifically, it is preferable that the atmosphere in which the lithium silicate layer forming step is performed has a dew point temperature of at least −60° C. but not more than −20° C. Even if the dew point temperature falls below −60° C., the produced negative electrode 10 has no functional problem. However, the unit cost can probably be high. The upper limit of the dew point temperature is important in order to prevent lithium from being inactivated. That is, when the dew point temperature of the atmosphere exceeds the above-mentioned range, there is a possibility that lithium reacts with moisture in the air and is inactivated before it forms a Li—O—Si bond.

The atmosphere having the above-mentioned dew point temperature, for example, is the air atmosphere. The temperature of the air atmosphere, for example, is room temperature. In the case where the lithium silicate layer forming step is performed in the air atmosphere, no particular production equipment is needed. Of course, it also is possible to perform the lithium silicate forming step in various atmospheres such as an inert atmosphere filled with an inert gas, e.g., nitrogen gas and a rare gas, and an atmosphere at a higher temperature than room temperature.

The time (specific period) for which the silicon oxide layer 23 is maintained in the above-mentioned atmosphere is not specifically limited. However, a maintenance period, for example, of 24 hours or more is recommended. The lower limit of a preferable maintaining period is 48 hours. When a sufficient maintaining period is set, lithium can be sufficiently diffused into the silicon oxide layer 23, so that a sufficient amount of lithium silicate is formed in the vicinity of the surface of the negative electrode current collector 11. Even if the maintaining period exceeds the above-mentioned range, there is no functional problem in the negative electrode 10 to be produced. However, there is a possibility of a reduction in productivity. The upper limit of the maintaining period, for example, is 72 hours or 96 hours. The upper limit and the lower limit of the maintaining period can be arbitrarily selected from the above-mentioned range.

It should be noted that, although lithium is present also in the second silicon oxide layer 24, the amount thereof is small. Further, it is considered that lithium silicate is present also in the negative electrode active material layer 14 in a slight amount. However, the lithium silicate in the negative electrode active material layer 14 does not form a layer, and does not contribute to an improvement in adhesion strength between the negative electrode current collector 11 and the negative electrode active material layer 14. The effects of improving the adhesion strength can be enjoyed due to the presence of lithium silicate with a high concentration at the interface between the negative electrode current collector 11 and the negative electrode active material layer 14, as is the case of the present invention, in other words, the presence of lithium silicate at the interface to the extent that allows lithium silicate formed in a layer to be observed by Auger electron spectroscopy to be described later.

According to this embodiment, the first silicon oxide layer 25 and the second silicon oxide layer 24 can be formed using the same evaporation source. Therefore, the first silicon oxide layer 25 and the second silicon oxide layer 24 can form the silicon oxide layer 23 that has a randomly indented interface, or that is continuous with no interface. The lithium silicate layer 15 that contributes to an improvement in adhesion strength between the negative electrode current collector 11 and the negative electrode active material layer 14 can be formed by allowing the silicon oxide layer 23 to absorb lithium and maintaining it for a specific period of time.

It also is possible to employ a method in which the lithium silicate layer 15 is formed on the negative electrode current collector 11 beforehand and thereafter the negative electrode active material layer 14 is formed thereon. According to this method, the effects of improving the adhesion strength between the negative electrode current collector 11 and the negative electrode active material layer 14 due to the lithium silicate layer 15 may possibly be restrictive. This is because there is a possibility that an interface is formed between the lithium silicate layer 15 and the negative electrode active material layer 14, and separation occurs at the interface.

Next, the lithium ion battery of this embodiment that uses the negative electrode 10 is described.

Figure 6:
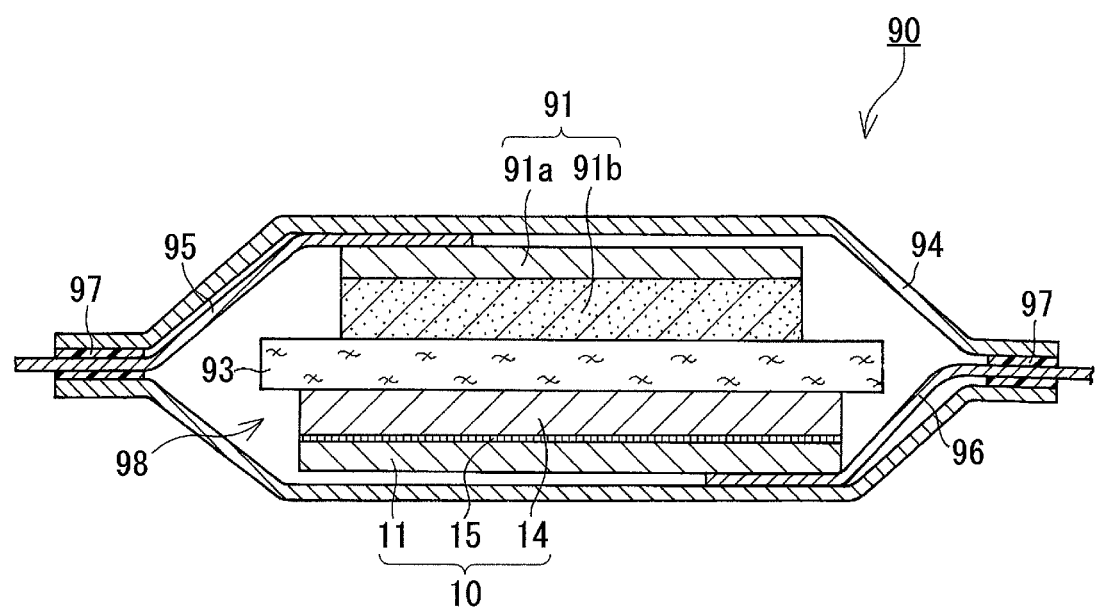
FIG. 6 is a longitudinal sectional view showing one embodiment of a lithium ion battery of the present invention.

As shown in FIG. 6, a lithium ion battery 90 is provided with an outer casing 94, a laminated electrode assembly 98, and an electrolyte (not shown) with lithium ion conductivity. The electrode assembly 98 is accommodated in the outer casing 94. The electrode assembly 98 includes a positive electrode 91, the negative electrode 10, and a separator 93. The separator 93 is disposed between the positive electrode 91 and the negative electrode 10. The electrode assembly 98 is impregnated with the electrolyte.

The negative electrode 10, as has been described with reference to FIG. 1A and FIG. 1B, includes the negative electrode current collector 11, the negative electrode active material layer 14, and the lithium silicate layer 15. In the battery 90, the negative electrode active material layer 14 and the lithium silicate layer 15 are provided only on one surface of the negative electrode current collector 11. The positive electrode 91 includes a positive electrode current collector 91a and a positive electrode active material layer 91b that is provided on one surface of the positive electrode current collector 91a. One end of a negative electrode lead 96 is connected to the other surface of the negative electrode current collector 11. Similarly, one end of a positive electrode lead 95 is connected to the other surface of the positive electrode current collector 91a.

The outer casing 94 has a pair of openings at positions in an opposite direction to each other. The other end of the positive electrode lead 95 extends outwardly through one of the openings and the other end of the negative electrode lead 96 extends outwardly through the other opening. The openings of the outer casing 94 each are closed using a resin material 97.

The positive electrode active material layer 91b releases lithium during charge and absorbs lithium during discharge. The negative electrode active material layer 14 absorbs lithium during charge and releases lithium during discharge.

The application of the negative electrode 10 of this embodiment is not limited to laminated lithium ion batteries. The negative electrode 10 can be used also for cylindrical batteries having a spiral (rolled) electrode assembly or rectangular batteries having an electrode assembly wound into a flat shape. Further, the electrode assembly of a laminated battery may be configured such that the positive electrode and the negative electrode form three or more layers in total. In this case, a positive electrode having a positive electrode active material layer on both sides or one side of a positive electrode current collector and a negative electrode having a negative electrode active material layer on both sides or one side of a negative electrode current collector are used in such a manner that all the positive electrode active material layers face the negative electrode active material layers, and all the negative electrode active material layers face the positive electrode active material layers.

In the lithium ion battery of this embodiment, components other than the negative electrode are not specifically limited.

As a positive electrode active material, a known material in this field can be used. Examples of such a material include lithium-containing transition metal oxides such as lithium cobalt oxide ($LiCoO_2$), lithium nickel oxide ($LiNiO_2$), and lithium manganese oxide ($LiMn_2O_4$). The positive electrode active material layer 91b may be composed only of the positive electrode active material, or may be composed of a mixture containing the positive electrode active material, a binder, and a conductive agent. Further, in the same manner as the negative electrode active material layer 14, the positive electrode active material layer 91b may be composed of a plurality of columnar bodies.

Examples of the material for the positive electrode current collector 91a include Al, Al alloy, Ni, and Ti.

As an electrolyte with lithium ion conductivity, a known solid electrolyte and non-aqueous electrolyte can be mentioned. The non-aqueous electrolyte typically contains a non-aqueous solvent, and lithium salt that has been dissolved therein.

The separator 93 typically is composed of a microporous film made of resin. Alternatively, a solid electrolyte or a gel electrolyte with lithium ion conductivity also can be used as a separator instead of the microporous film. As the outer casing 94, metal foil such as aluminium foil laminated with a resin sheet can be used.

EXAMPLES

Example 1

(1) Producing Positive Electrode Active Material

Cobalt sulfate was dissolved in an aqueous solution of nickel sulfate to obtain an aqueous solution having a metal element (Ni and Co) concentration of 2 mol/L, and a Ni-to-Co molar content ratio of 8.5:1.5. A 2 mol/L sodium hydroxide aqueous solution was slowly dripped to the obtained aqueous solution while stirring, and a precipitate was obtained. The resultant precipitate was separated, and thereafter washed with water and dried at 80° C. to obtain a composite hydroxide expressed by $Ni_{0.85}Co_{0.15}(OH)_2$. Further, this composite hydroxide was heated in the air at 900° C. for 10 hours, and a composite oxide expressed by $Ni_{0.85}Co_{0.15}O$ was obtained.

Next, the above-mentioned composite oxide and lithium hydroxide monohydrate were mixed so that the sum of the number of moles of Ni and the number of moles of Co in the composite oxide was equal to the number of moles of Li in the lithium hydroxide monohydrate. The obtained mixture was heated in the air at 800° C. for 10 hours. Thus, a lithium nickel composite oxide (positive electrode active material) expressed by $LiNi_{0.85}Co_{0.15}O_2$ was obtained. This positive electrode active material had an average particle size of 10 μm. This average particle size represents a volume-average particle size (D50) of secondary particles of the positive electrode active material.

(2) Producing Positive Electrode

A positive electrode material mixture paste was obtained by dispersing 93 parts by weight of the above positive electrode active material in the form of powder, 3 parts by weight of acetylene black, and 4 parts by weight of polyvinylidene fluoride powder, into N-methyl-2-pyrrolidone. This positive electrode material mixture paste was applied to one surface of a 15 μm-thick aluminium foil, and then dried and rolled. As a result, a positive electrode including a positive electrode active material layer with a thickness of 130 μm was obtained.

(3) Production of Negative Electrode

A laser processing was conducted on the surface of a roller made of forged steel with a diameter of 50 mm to form circular concave portions each having a diameter of 20 μm and a depth of 8 μm. Thus, a roller for forming convex portions was obtained. The center points of the concave portions were arranged in a two-dimensional triangle lattice (as a staggered lattice pattern) so that the distance between two adjacent centers along the surface of the roller was 20 μm. The same two rollers for forming convex portions were produced and disposed so that the axes of the rollers were parallel to each other. In this manner, a pair of nip rollers was prepared.

A 20 μm-thick copper alloy foil (made of copper alloy containing 0.03 wt % of zirconia of the total; product name: HCL-02Z, manufactured by Hitachi Cable, Ltd.) was allowed to pass through between the pair of nip rollers to form convex portions on the copper alloy foil. At this time, a load of a linear pressure of 2.0 kgf/cm (about 19.6 N/cm) was applied between the pair of nip rollers. The copper alloy foil was observed with a scanning electron microscope, and a plurality of convex portions each having a maximum height Rz of about 8 μm were found to be formed on the front surface and the back surface of the copper alloy foil. This copper alloy foil was cut into a size with a length of 35 mm and a width of 185 mm. Thus, a negative electrode current collector was obtained.

Next, a first silicon oxide layer and a second silicon oxide layer were formed in this order on the negative electrode current collector by a vacuum deposition method using silicon as an evaporation source. Thus, a preliminary negative electrode composed of the negative electrode current collector, the first silicon oxide layer, and the second silicon oxide layer was obtained. Vacuum deposition was performed using a commercially available vapor deposition apparatus (manufactured by ULVAC, Inc.) having the same configuration as the vapor deposition apparatus described above with reference to FIG. 5. The first silicon oxide layer and the second silicon oxide layer were composed of a plurality of columnar bodies. The respective columnar bodies were growing in the height direction of each convex portion of the negative electrode current collector from the top of the convex portion and the side surface thereof in the vicinity of the top. The vapor deposition conditions were as follows.

(Vapor Deposition Conditions for First Silicon Oxide Layer)

Negative electrode active material (evaporation source): silicon with a purity of 99.9999%, manufactured by Kojundo Chemical Laboratory Co., Ltd.

Oxygen emitted from the nozzle: oxygen with a purity of 99.7%, manufactured by NIPPON SANSO CORPORATION Flow rate of oxygen from the nozzle: 70 sccm (Standard Cubic Centimeter per Minutes)

Angle α: 60° (see FIG. 5)

Accelerated voltage of electron beam: −8 kV

Emission: 500 mA

Vapor deposition time: 30 seconds (Vapor Deposition Conditions for Second Silicon Oxide Layer)

Negative electrode active material (evaporation source): silicon with a purity of 99.9999%, manufactured by Kojundo Chemical Laboratory Co., Ltd.

Flow rate of oxygen from the nozzle: 0 sccm

Angle α: 60° (see FIG. 5)

Vapor deposition time: 150 seconds

The first silicon oxide layer and the second silicon oxide layer had a thickness of 16 μm in total. The oxygen content ratio in each of the first silicon oxide layer and the second silicon oxide layer was quantitated by Auger electron spectroscopy. As a result, the silicon oxide contained in the first silicon oxide layer had a composition of $SiO_{1.3}$, and the silicon oxide contained in the second silicon oxide layer had a composition of $SiO_{0.2}$. The first silicon oxide layer had a thickness of 1.8 μm by itself. It should be noted that, even if oxygen supply to the chamber was stopped, it is still difficult to allow only pure silicon to deposit. Although it also depends on the vacuum degree, a silicon oxide layer containing oxygen with approximately x=0.2, for example, is formed.

Next, lithium metal was vapor deposited on the surface of the second silicon oxide layer. The amount of vapor deposition of lithium metal was adjusted to the irreversible capacity of the negative electrode to be obtained. The vapor deposition of lithium metal was performed in an argon atmosphere using a resistance heating vapor deposition apparatus (manufactured by ULVAC, Inc.). Lithium metal was put into a tantalum boat inside the resistance heating vapor deposition apparatus, and vapor deposition was performed for 10 minutes by energizing the tantalum boat with a current of 50 A.

(4) Forming Lithium Silicate Layer

Next, the preliminary negative electrode after the vapor deposition of lithium metal was maintained in the air atmosphere at room temperature with a dew point temperature of −20° C. for one day. In this manner, the negative electrode of Example 1 provided with a lithium silicate layer at the interface between the negative electrode current collector and the negative electrode active material layer was obtained.

(5) Assembling Lithium Ion Battery

A separator (a polyethylene microporous film with a thickness of 20 μm, product name: Hipore, manufactured by Asahi Kasei Corporation) was disposed between the positive electrode and the negative electrode so that the positive electrode active material layer and negative electrode active material layer faced each other with the separator being interposed therebetween. Thus, an electrode assembly having the positive electrode, the separator, and the negative electrode was obtained. This electrode assembly was wound into a flat shape. Before forming the electrode assembly, a positive electrode lead made of aluminium was welded to the positive electrode current collector, and a negative electrode lead made of nickel was welded to the negative electrode current collector.

A non-aqueous electrolyte in the liquid phase was obtained by dissolving $LiPF_6$ at a concentration of 1.4 mol/L in a mixed solvent containing ethylene carbonate, ethyl methyl carbonate, and diethyl carbonate at a volume ratio of 2:3:5. The electrode assembly was put into an outer casing together with the non-aqueous electrolyte in such a manner that the positive electrode lead and the negative electrode lead extended outwardly through the openings of the outer casing. As the outer casing, a sheet in which a resin sheet was laminated to both surface of an aluminium foil was used. The openings of the outer casing were welded under vacuum suction of the inside of the outer casing. Thus, the lithium ion battery of Example 1 was obtained.

Examples 2 to 6 and Comparative Example 1

The lithium ion batteries of Examples 2 to 6 were produced in the same manner as in Example 1 except that one or both of the dew point temperature and the maintaining period were varied. The lithium ion battery of Comparative Example 1 was produced in the same manner as in Example 1 except that the battery was assembled without the maintaining period after the vapor deposition of lithium metal.

[Adhesion Strength Test]

Charge and discharge were performed once for each of the lithium ion batteries of Examples 1 to 6 and Comparative Example 1 under the following conditions.

Constant current charge: 370 mA (1.0 C), Final voltage 4.15 V

Constant voltage charge: Final current 18.5 mA (0.05 C), Interval 20 minutes

Constant current discharge: 74 mA (0.2 C), Final voltage 2 V, Interval 20 minutes After one charge/discharge cycle, the lithium ion battery was disassembled in a discharged state, and the negative electrode was removed. The removed negative electrode was cut into a size of 2 cm×3 cm and measured for the adhesion strength between the negative electrode current collector and the negative electrode active material layer. The adhesion strength was measured using a tack tester (TAC-II, manufactured by RHESCA Corporation limited) under the following conditions. Apiece of double-sided adhesive tape (No. 515, manufactured by NITTO DENKO CORPORATION) was attached onto the tip of a probe (with a tip diameter of 2 mm). The pressing speed was set to 30 mm/min, the pressing time was set to 10 seconds, the load was set to 400 gf, and the peeling speed was set to 600 mm/min. The measurement was performed at arbitrarily selected three points, and the mean value was taken as the measured value.

[Charge/Discharge Cycle Test]

A charge/discharge cycle test was conducted for the batteries of Examples 1 to 6 and Comparative Example 1. Specifically, in an environment at 25° C., constant current charge was performed at 370 mA (1.0 C) to 4.15 V, then constant voltage charge was performed until a final current of 18.5 mA (0.05 C). Thereafter, constant current discharge was performed at 74 mA (0.2 C) to 2 V. The discharge capacity at that time was taken as an initial discharge capacity. Thereafter, the current value during discharge was set to 370 mA (1.0 C), and the charge/discharge cycle was repeated. After 200 cycles, constant current discharge was performed at 74 mA (0.2 C), and the discharge capacity after 200 cycles was measured. Then, the percentage of the discharge capacity after 200 cycles with respect to the initial discharge capacity (capacity retention rate (%)) was calculated.

Table 1 shows the results of the adhesion strength test and the charge/discharge cycle test.

TABLE 1

| | Dew point temperature (° C.) | Maintaining period (days) | Adhesion strength after 1 charge/discharge cycle $(kgf/cm^2)$ | Capacity retention rate after 200 charge/discharge cycles (%) |
|---|---|---|---|---|
| EX. 1 | −20 | 3 | 25.4 | 71 |
| EX. 2 | −20 | 7 | 26.1 | 75 |
| EX. 3 | −30 | 1 | 21.5 | 70 |
| EX. 4 | −30 | 3 | 26.4 | 73 |
| EX. 5 | −30 | 7 | 27.7 | 77 |
| EX. 6 | −60 | 3 | 27.3 | 76 |
| C. EX. 1 | — | 0 | 12.0 | 53 |

As shown in Table 1, the lower the dew point temperature and the longer the maintaining period, the higher the adhesion strength was. Further, the examples that had high adhesion strength also showed good cycle characteristics, and achieved a capacity retention rate of 70% or more after 200 charge/discharge cycles. In contrast, the battery of Comparative Example 1 showed low adhesion strength of 12 $kgf/cm^2$ and low capacity retention rate after 200 charge/discharge cycles of 53%.

[Mapping of Lithium by Auger Electron Spectroscopy]

A negative electrode that had not absorbed lithium (preliminary negative electrode), the negative electrode of Example 3, and the negative electrode of Example 5 each were cut into a size of 5 mm×5 mm, and the cross sections thereof were polished using a Cross Section Polisher (SM-09010, manufactured by JEOL Ltd.). Focusing on one of the columnar bodies that appeared in the cross section, mapping of oxygen and silicon was performed by Auger Electron Spectrometer for the preliminary negative electrode. Oxygen in the preliminary negative electrode was presumably bonded to silicon. However, it was difficult to determine whether silicon in the preliminary negative electrode was present as a single substance or was bonded to oxygen, because of its small chemical shift. Mapping of lithium attributed to lithium metal and lithium attributed to lithium oxide was performed for Example 3 and Example 5.

In the preliminary negative electrode, a region where the oxygen content ratio was high and the silicon content ratio was low was present in the vicinity of the convex portions of the negative electrode current collector. That is, this region corresponds to the first silicon oxide layer.

In Example 3, although a large amount of lithium oxide (lithium silicate) was present in the vicinity of the interface between the negative electrode current collector (convex portions) and the negative electrode active material layer (columnar bodies), a relatively large amount of lithium was entirely present in a metallic state also in the negative electrode active material layer. In Example 5, lithium was hardly observed in the negative electrode active material layer, and lithium oxide was intensely present in the vicinity of the interface between the negative electrode current collector and the negative electrode active material layer. The region in the vicinity of the interface where lithium oxide was intensely present almost corresponded to the region of the first silicon oxide layer in the preliminary negative electrode.

[Adhesion Strength Test after 30 Charge/Discharge Cycles]

The adhesion strength of the negative electrode active material layer after 30 charge/discharge cycles was measured for the lithium ion batteries produced using the negative electrodes of Example 3 and Example 5. The adhesion strength of Example 3 was 18 kgf/cm$^2$, and the adhesion strength of Example 5 was 24 kgf/cm$^2$. That is, it has been proved that a sufficient amount of lithium silicate can be formed at the interface between the negative electrode current collector and the negative electrode active material layer by setting a sufficient maintaining period, thereby improving the adhesion strength between the negative electrode current collector and the negative electrode active material layer.

Comparative Example 2

Using a preliminary negative electrode and a lithium metal foil as a counter electrode, a battery was assembled and subjected to the charge/discharge process in an environment at 25° C. Specifically, it was charged at 0.1 C (37 mA) until the potential of the negative electrode reached 0 V (vs. Li/Li$^+$). Thereafter, it was discharged at 0.1 C (37 mA) until the potential of the negative electrode reached 1.5 V (vs. Li/Li$^+$). The amount of lithium that corresponds to the irreversible capacity was estimated from the difference between the charge capacity and the discharge capacity.

Next, using a separately prepared preliminary negative electrode and a lithium metal foil, a battery was assembled and charged in an environment at 25° C. with the electrical amount being regulated, thereby allowing the silicon active material layer of the preliminary negative electrode to absorb lithium in an amount that corresponds to the irreversible capacity. After lithium was absorbed electrochemically, the battery was disassembled and the negative electrode was removed. The removed negative electrode was washed with dimethyl carbonate, dried, and then maintained at a dew point of −30° C. for one day. Thereafter, mapping of lithium was performed by Auger electron spectroscopy.

According to the negative electrode of Comparative Example 2, although lithium bonded to oxygen was present in the vicinity of the surface of the negative electrode current collector, an exceptionally large amount of lithium in a metallic state was observed entirely in the negative electrode active material layer (columnar bodies).

The adhesion strength test was conducted under the aforementioned conditions for the negative electrode of Comparative Example 2 that had been produced under the same conditions. The negative electrode of Comparative Example 2 had only a very low adhesion strength of 4.4 kgf/cm$^2$. Further, after the charge/discharge cycle test, the negative electrode of Comparative Example 2 was disassembled and observed by visual inspection, a part of the negative electrode active material layer was separated from the negative electrode current collector.

The reason why forming a lithium silicate layer that contributes to an improvement in adhesion strength is impossible when lithium is absorbed during the charge after the battery has been assembled is not necessarily clear. The inventors presume that a reaction between the electrolyte and the active material proceeds in parallel with the absorption of lithium, as a result of which the lithium absorbed by the active material layer remains entirely in the active material layer, and therefore lithium silicate is not formed selectively in the vicinity of the interface between the current collector and the active material layer.

The invention claimed is:

1. A negative electrode for a lithium ion battery, comprising:
    a negative electrode current collector;
    a negative electrode active material layer containing silicon; and
    a lithium silicate layer that contains lithium, oxygen, and silicon forming a Li—O—Si bond, the lithium silicate layer being formed at the interface between the negative electrode current collector and the negative electrode active material layer, the lithium silicate layer having a higher oxygen content ratio than the negative electrode active material layer, the lithium silicate layer having oxygen to silicon content ratio greater than or equal to 1.3 and less than 2,
    wherein each of the negative electrode active material layer and the lithium silicate layer essentially consists of lithium, oxygen and silicon, and
    the Li—O—Si bond does not contribute to charge-discharge reactions.

* * * * *